(12) United States Patent
Bornand et al.

(10) Patent No.: US 11,614,177 B2
(45) Date of Patent: Mar. 28, 2023

(54) SEAL ARRANGEMENT AND CHECK VALVE INCLUDING SAME

(71) Applicant: Mueller Refrigeration, LLC, Hartsville, TN (US)

(72) Inventors: Mark Bornand, Gallatin, TN (US); Shi Xi Wei, Gallatin, TN (US)

(73) Assignee: MUELLER REFRIGERATION, LLC, Hartsville, TN (US)

( * ) Notice: Subject to any disclaimer, the term of this patent is extended or adjusted under 35 U.S.C. 154(b) by 0 days.

(21) Appl. No.: 17/403,255

(22) Filed: Aug. 16, 2021

(65) Prior Publication Data

US 2023/0047890 A1 Feb. 16, 2023

(51) Int. Cl.
*F16K 15/06* (2006.01)
*F16K 27/02* (2006.01)

(52) U.S. Cl.
CPC ........ *F16K 27/0209* (2013.01); *F16K 15/063* (2013.01)

(58) Field of Classification Search
CPC ............... F16K 15/063; F16K 27/0209; Y10T 137/7851; Y10T 137/7935
See application file for complete search history.

(56) References Cited

U.S. PATENT DOCUMENTS

| | | | |
|---|---|---|---|
| 767,118 A * | 9/1904 | Cook | ...................... F16K 15/06 |
| 2,758,609 A | 8/1956 | Dickert et al. | |
| 3,324,673 A | 6/1967 | Falke et al. | |
| 3,586,291 A | 6/1971 | Malec | |
| 3,664,371 A | 5/1972 | Schneider | |
| 3,754,568 A | 8/1973 | Gallagher et al. | |
| 4,258,925 A * | 3/1981 | Guyton | ................... F16K 15/03 |
| | | | 137/527 |
| 5,762,103 A | 6/1998 | Gregoire | |
| 6,574,976 B2 | 6/2003 | Takano et al. | |

(Continued)

FOREIGN PATENT DOCUMENTS

WO 2019/219732 A1 11/2019

OTHER PUBLICATIONS

Carolyn Mathas "Check Valves—A Tutorial 'Exploring ideas around media flow management'", https://www.specialtymfg.com/wp-content/uploads/2019/02/check-valve-tutorial.pdf, 4 pp.

(Continued)

*Primary Examiner* — P. Macade Nichols
(74) *Attorney, Agent, or Firm* — Eckert Seamans Cherin & Mellott, LLC

(57) ABSTRACT

A check valve includes a housing defining an inlet, an outlet, a passage between the inlet and outlet, and a sealing surface along the passage. A piston member is disposed about a longitudinal axis and has a sealing face disposed perpendicular to the longitudinal axis and a circular groove defined therein extending inward from the sealing face. An O-ring is disposed in the groove. A biasing member exerts a biasing force on the piston and thus forces the O-ring into sealing engagement with the sealing surface of the housing. The piston member is moveable from a first position in which the O-ring is sealingly engaged with the sealing surface of the housing and thus the outlet is sealed from the inlet, and a second position in which the O-ring is spaced from the sealing surface of the housing and thus the outlet is not sealed from the inlet.

21 Claims, 8 Drawing Sheets

(56) References Cited

U.S. PATENT DOCUMENTS

| 7,730,735 | B2 | 6/2010 | Maruya et al. |
| 2008/0101965 | A1 | 5/2008 | Zhang |
| 2017/0159834 | A1* | 6/2017 | Jeon ........................ B60T 8/341 |

OTHER PUBLICATIONS

Henry Technologies Pty Ltd "Product Catalogue", Date of publication: Apr. 2016, http://www.henry-group.net/wp-content/uploads/2017/12/Henry-Technologies_E1_Catalogue_Interactive_low.pdf, pp. 1-13.

DFT® Inc., Product Catalog, "The Check Valve Doctor™", V4 Dec. 2018R1, https://catalog.dft-valves.com/Asset/DFT-Check-Valve-Catalog-52pg-V42018-1.pdf, Copyright 2018, 52 pp. (Due to size constraints, the 52 page Catalog was split into two (2) .pdf documents which are attached herewith).

* cited by examiner

SEAL ARRANGEMENT AND CHECK VALVE INCLUDING SAME

BACKGROUND

Field

The disclosed concepts relate in general to seal arrangements for use in valves and, more particularly, to seal arrangements for use in check valves. The disclosed concepts further relate to check valves including such seal arrangements for use in regulating a flow of refrigerant.

Background Information

A refrigerant system includes portions that control the flow direction of refrigerant. One or more check valves are typically used in the refrigeration system to ensure that the refrigerant can only travel in one direction and not back up to another part of the system. Conventional check valves used in such applications employ a flat gasket material (e.g., formed from a planar sheet of material) to form a seal between a movable member of the check valve and a fixed portion of the valve when the movable member is in the "closed" position (and thus the check valve is "closed") and no refrigerant can pass through the check valve. Conversely, when the aforementioned movable member is in an "open" position, the flat gasket material is only engaged with one of the movable member or the fixed portion of the valve and thus the aforementioned seal is broken (and the valve is in an "open" position) and refrigerant can therefore pass through the check valve. While such check valves generally meet the basic requirements for such arrangement, the cost and reliability of such conventional arrangements leave room for improvement.

SUMMARY

These needs, and others, are met by at least one embodiment of the disclosed and claimed concepts which as one aspect provides a sealing arrangement for a check valve. The sealing arrangement comprises: a piston member disposed about a longitudinal axis, the piston member having a sealing face disposed perpendicular to the longitudinal axis; a groove defined in the piston member extending inward from the sealing face, the groove spaced a radial distance from the longitudinal axis; and an O-ring disposed in the groove.

The groove may flare from an opening width in the sealing face to a base width spaced the depth of the groove from the opening width, and the base width may be greater than the opening width.

The O-ring may have a circular cross-section defined by an outer diameter, and the outer diameter may be greater than the opening width of the groove. The outer diameter may be less than the base width of the groove.

The piston member may comprise a head portion and a tail portion extending from the tail portion to a distal end, and the sealing face may be disposed on the head portion opposite the tail portion. The tail portion may define a cylindrical recess therein extending from an opening defined in the distal end thereof toward the head portion, and the cylindrical recess may be structured to cooperatively slidingly engage a protruding portion of a housing of the check valve.

The sealing arrangement may further comprise a retention ring disposed about the longitudinal axis and coupled thereto, and a radially inward wall of the groove may be defined by a radially outward wall of the retention ring. The piston member may comprise a neck portion extending along the longitudinal axis, the neck portion may define a retention groove therein extending radially inward toward the longitudinal axis, and the retention ring may be coupled to the piston member via a mechanical interaction between the retention ring and the retention groove. The piston member may comprise an aperture defined therein extending axially along the longitudinal axis from an opening toward the tail portion, and the retention ring may be coupled to the piston by a fastener having a coupling portion mechanically engaged with the aperture.

The piston member may further comprise a vent passage extending between the groove and a surface of the piston opposite the sealing face, and the vent passage may be structured to provide for the evacuation of any fluid trapped between the O-ring an the groove.

As another aspect, a check valve is provided. The check valve comprises: a housing defining an inlet, an outlet, a passage between the inlet and the outlet, and a sealing surface along the passage; a sealing arrangement disposed within the passage, the sealing arrangement comprising: a piston member disposed about a longitudinal axis, the piston member having: a sealing face disposed perpendicular to the longitudinal axis; and a circular groove defined in the piston member extending inward from the sealing face, the circular groove disposed around and spaced a radial distance from the longitudinal axis; an O-ring disposed in the groove; and a biasing member in engagement with the housing and the piston member so as to exert a biasing force on the piston and thus force the O-ring into sealing engagement with the sealing surface of the housing such that the outlet is sealed from the inlet, the piston member may be moveable from: a first position in which the O-ring is sealingly engaged with the sealing surface of the housing and thus the outlet is sealed from the inlet, and a second position in which the O-ring is spaced from the sealing surface of the housing and thus the outlet is not sealed from the inlet.

The piston member may be structured to move from the first position to a second position when a force exerted on the sealing face is greater than the biasing force.

The housing may comprise: a main body defining the inlet; and a tailpiece defining the outlet, the tailpiece may be coupled to the main body.

The biasing member may comprise a coil spring.

The groove may flare from an opening width in the sealing face to a base width spaced the depth of the groove from the opening width, and the base width may be greater than the opening width. The O-ring may have a circular cross-section defined by an outer diameter, and the outer diameter may be greater than the opening width of the groove.

The piston member may comprise a head portion and a tail portion extending from the tail portion to a distal end, and the sealing face may be disposed on the head portion opposite the tail portion. The tail portion may define a cylindrical recess therein extending from an opening defined in the distal end thereof toward the head portion, and the cylindrical recess may be structured to cooperatively engage a protruding portion of a housing of the check valve.

The check valve may further comprise a retention ring disposed about the longitudinal axis and coupled thereto, and a radially inward wall of the groove may be defined by a radially outward wall of the retention ring.

The piston member may comprise a neck portion extending along the longitudinal axis, the neck portion may define a retention groove therein extending radially inward toward the longitudinal axis, and the retention ring may be coupled to the piston member via a mechanical interaction between the retention ring and the retention groove.

The piston member may comprise an aperture defined therein extending axially along the longitudinal axis from an opening toward the tail portion, and the retention ring may be coupled to the piston by a fastener having a coupling portion mechanically engaged with the aperture.

The piston member further comprise a vent passage extending between the groove and a surface of the piston opposite the sealing face, and the vent passage may be structured to provide for the evacuation of any fluid trapped between the O-ring an the groove.

BRIEF DESCRIPTION OF THE DRAWINGS

A full understanding of the disclosed concepts can be gained from the following description of the preferred embodiments when read in conjunction with the accompanying drawings in which.

DESCRIPTION OF THE PREFERRED EMBODIMENTS

Figure 1:
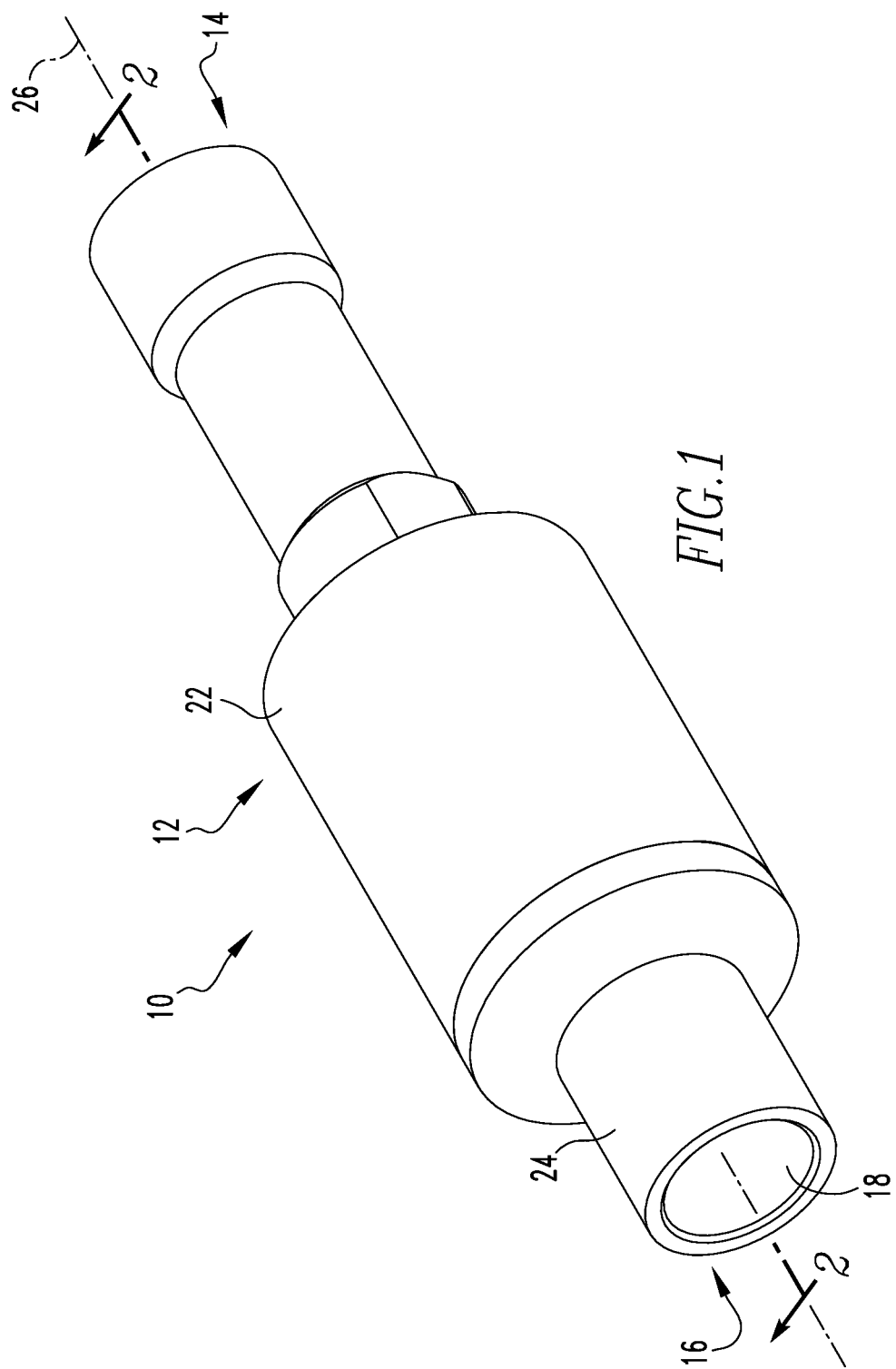
FIG. 1 is a perspective view of a check valve in accordance with one example embodiment of the disclosed concepts.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hubcaps. While all the elements are coupled as part of the automobile, it is understood that each hubcap is "associated" with a specific tire.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true. With regard to electronic devices, a first electronic device is "operatively coupled" to a second electronic device when the first electronic device is structured to, and does, send a signal or current to the second electronic device causing the second electronic device to actuate or otherwise become powered or active.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston. When the first lobe moves to its upward position, the first piston moves to a "corresponding" upper position, and, when the first lobe moves to a lower position, the first piston, moves to a "corresponding" lower position.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "by a large amount or degree" relevant to the term being modified as would be understood by one of ordinary skill in the art.

As used herein, "at" means on and/or near relevant to the term being modified as would be understood by one of ordinary skill in the art.

As is known in the art, refrigerant systems are specialized. As such, and as used herein, any construct modified by the adjective "refrigerant" expressly excludes non-refrigerant constructs such as, but not limited to, water system constructs.

An example check valve 10 in accordance with one example embodiment of the disclosed concepts will now be described in conjunction with FIGS. 1-5. Check valve 10 includes a housing 12 defining an inlet 14, an outlet 16, and a passage 18 extending between inlet 14 and outlet 16.

Housing 12 further defines a sealing surface 20 (FIGS. 2 and 3) that is disposed along passage 18 and encircles passage 18. In the example embodiment shown in FIGS. 1-5, housing 12 includes a main body 22 and a tailpiece 24 which are coupled together via any suitable arrangement (e.g., without limitation, weld, thread, etc.). In such example, inlet 14 is defined by main body 22 and outlet 16 is defined by tailpiece 24. Further, in such embodiment inlet 14, outlet 16, and passage 18 are all disposed along, and centered about a longitudinal axis 26, however, it is to be appreciated that such elements may be arranged in a non-linear fashion without varying from the scope of the disclosed concepts.

Continuing to refer to FIGS. 2-5, check valve 10 further includes a sealing arrangement 30 disposed within passage 18. Sealing arrangement 30 includes a piston assembly 31 having a piston member 32 disposed about longitudinal axis 26. Piston member 32 includes a head portion 34 and a tail portion 36 extending from head portion 34. Head portion 34 includes a sealing face 38, disposed opposite tail portion 36 and perpendicular to longitudinal axis 26, and a circular groove 40 defined in head portion 34 extending inward from sealing face 38 toward tail portion 36. Circular groove 40 is disposed around and spaced a radial distance (not numbered) from longitudinal axis 26. Tail portion 36 defines a cylindrical recess 42 therein extending inward from a distal end of tail portion 36 toward head portion 34. Cylindrical recess 42 is structured to cooperatively engage, and readily be able to slide along, a protruding portion of housing 12 of check valve 10. In the example embodiment shown in FIGS. 1-5, cylindrical recess 42 engages a protruding portion 44 of housing 12 that is provided as a portion of an inner member 46 of housing 12 that is positioned with passage 18 and coupled to the remainder of housing 12. In such arrangement, inner member 46 includes a central passage 48 that extends completely through protruding portion 44 so as to avoid a positive or negative pressure from developing in the portion of cylindrical recess 42 not occupied by protruding portion. Additionally in such arrangement, inner member 46 further includes a number (six are shown in the illustrated example) of outer passages 50 (FIGS. 4 and 5) provided therethrough so as to avoid blocking passage 18 by inner member 46.

Figure 2:
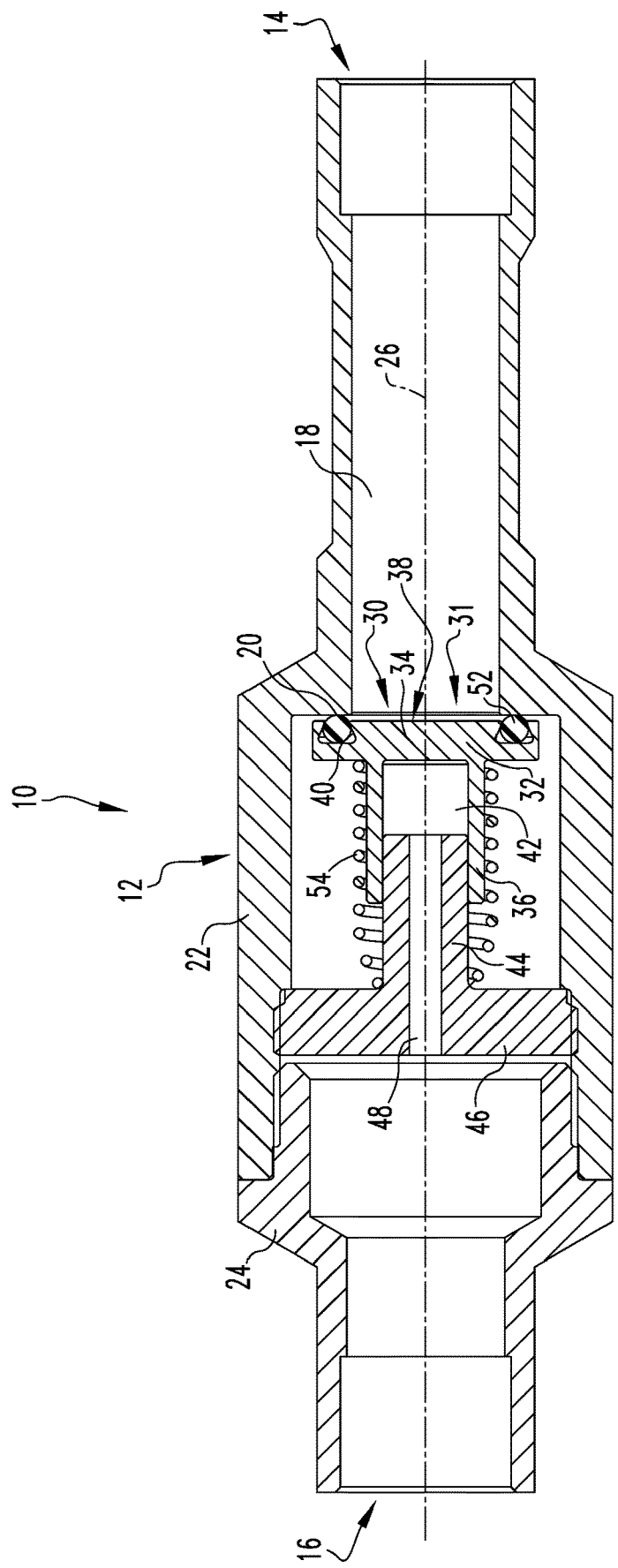
FIG. 2 is a sectional view of the check valve of FIG. 1 taken along 2-2 of FIG. 1 shown with a piston assembly thereof disposed in a first position in which the outlet of the check valve is sealed from the inlet of the check valve.
Figure 3:
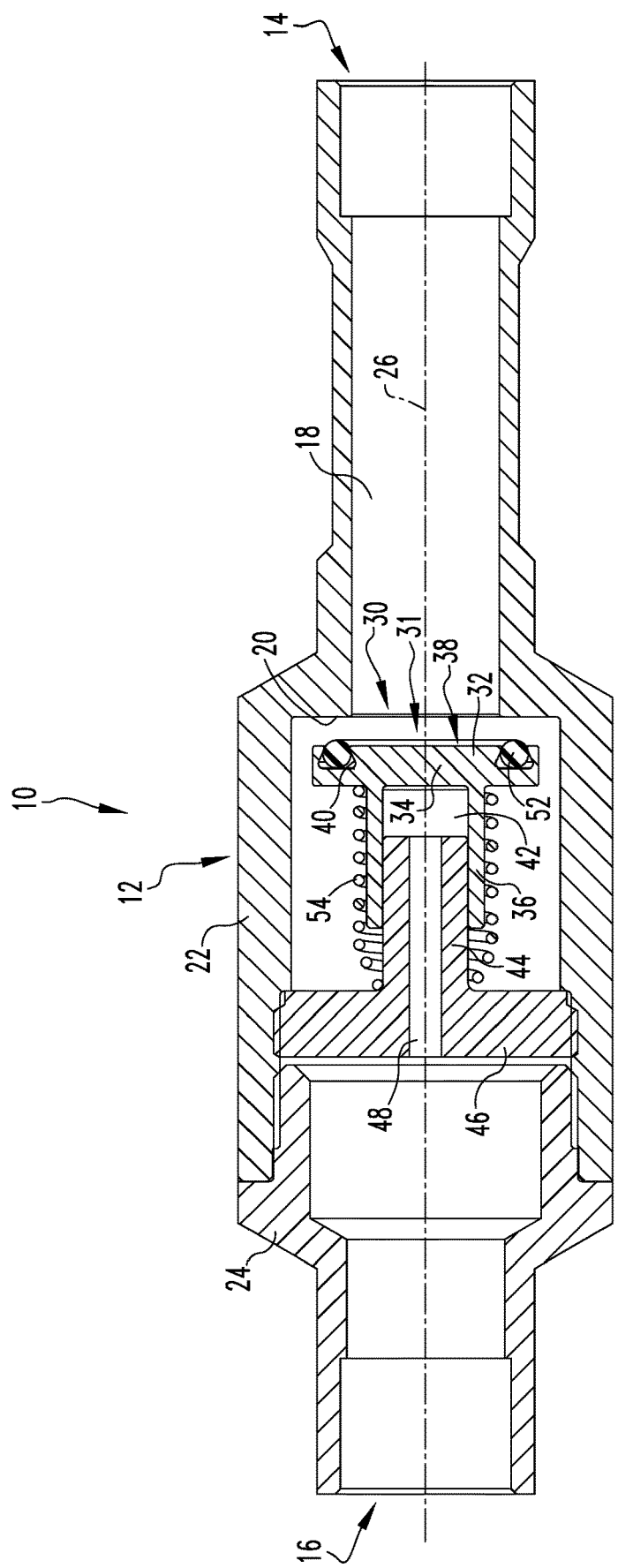
FIG. 3 is a sectional view of the check valve of FIG. 1 taken along 2-2 of FIG. 1 shown with a piston assembly thereof disposed in a second position in which the outlet of the check valve is open to the inlet of the check valve.
Figure 4:
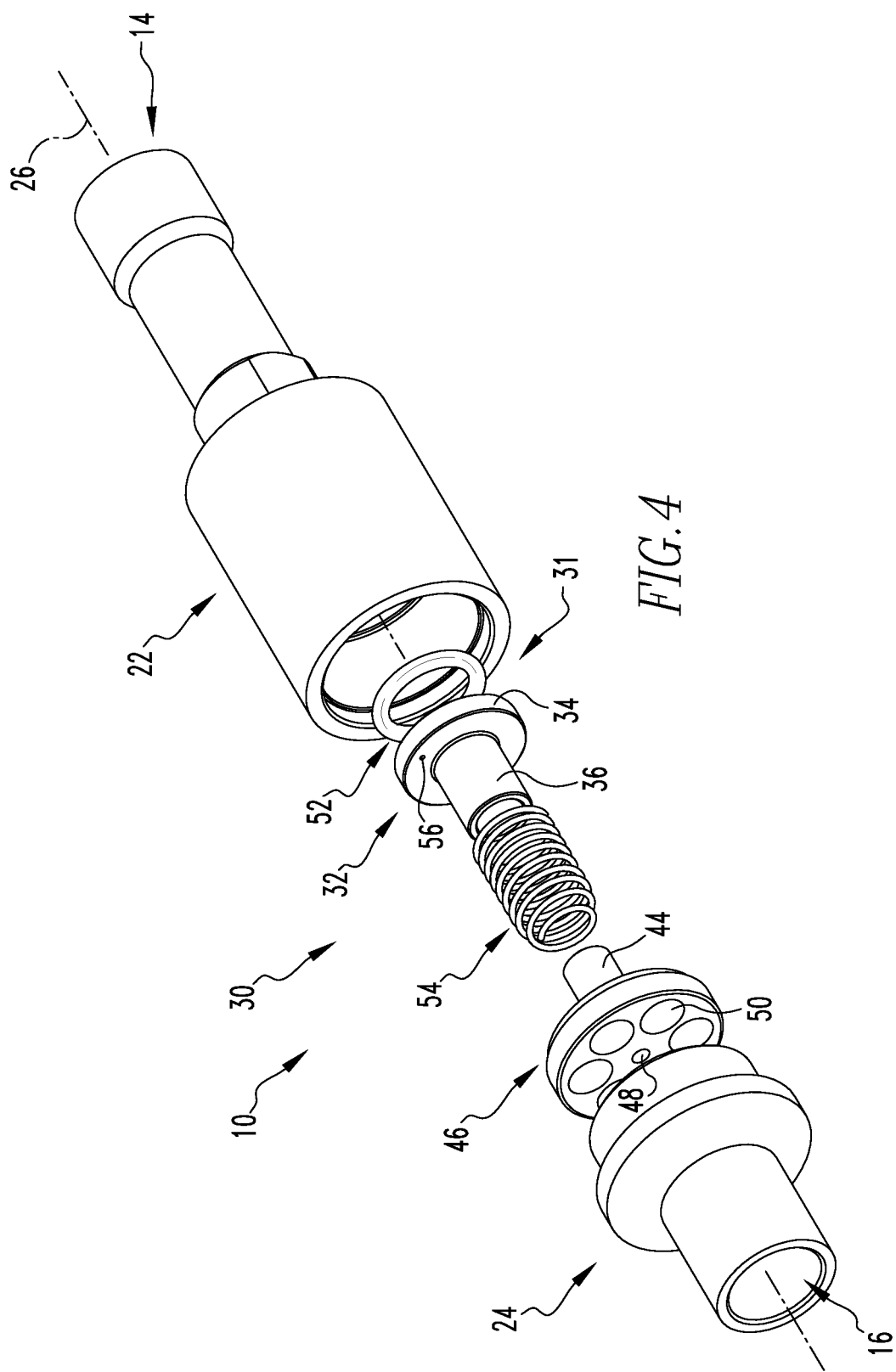
FIG. 4 is an exploded view of the check valve of FIG. 1 taken from the same perspective as the view of FIG. 1.
Figure 5:
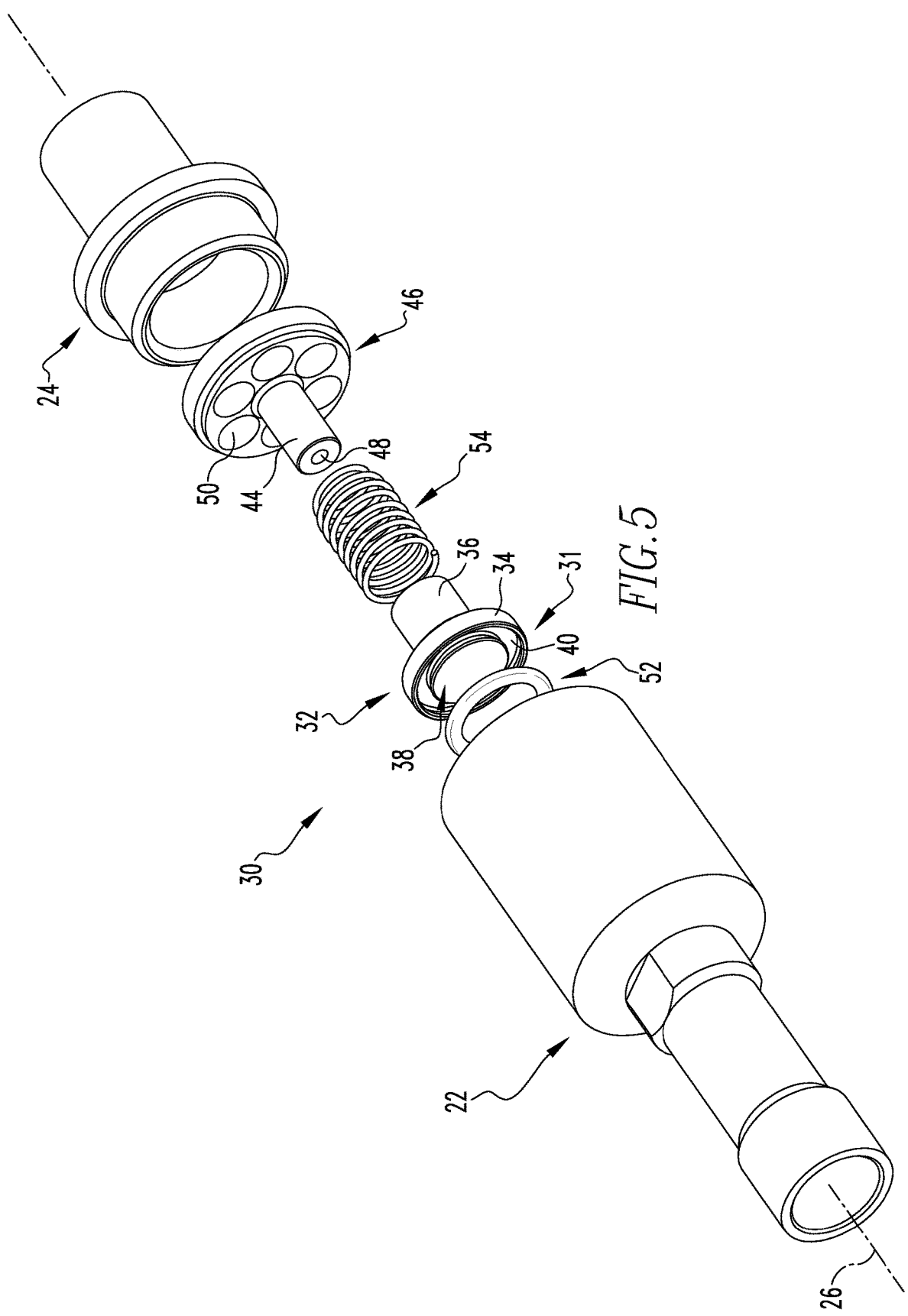
FIG. 5 is an exploded view similar to that shown in FIG. 3 but from an opposite perspective to the view shown in FIG. 4.

Piston assembly 31 of sealing arrangement 30 further includes an O-ring 52 disposed and constrained in groove 40. In such arrangement, O-ring 52 is generally snapped into place in groove 40. A biasing member 54 (e.g., a coil spring or other suitable biasing arrangement) in engagement with housing 12 and piston member 32 is further provided as a portion of sealing arrangement 30 for exerting a biasing force on piston member 32 and thus forcing piston assembly 31 in a first positioning, such as shown in FIG. 2, in which O-ring 52 thereof is sealingly engaged with sealing surface 20 of housing 12. With O-ring 52 of piston assembly 31 sealed against sealing surface 20 of housing 12, outlet 16 of housing 12 is sealed from inlet 14 of housing 12. If/when a force exerted on sealing face 38 (e.g., by a pressurized refrigerant entering inlet 14 of housing 12) of piston member 32 is greater than the biasing force exerted by biasing member 54, piston assembly 31 is displaced to a second positioning, such as shown in FIG. 3, in which O-ring 52 thereof is spaced from sealing surface 20 of housing 12 and thus outlet 16 of housing 12 is not sealed from inlet 14 of housing 12 and fluid can pass through passage 18 of check valve 10. As shown in FIG. 4 (and additionally FIGS. 6A and 6B), a vent passage 56 may be provided in head portion 34 of piston member 32 so as to provide for the evacuation of any fluid trapped behind O-ring 52 in groove 40.

Figure 6A:
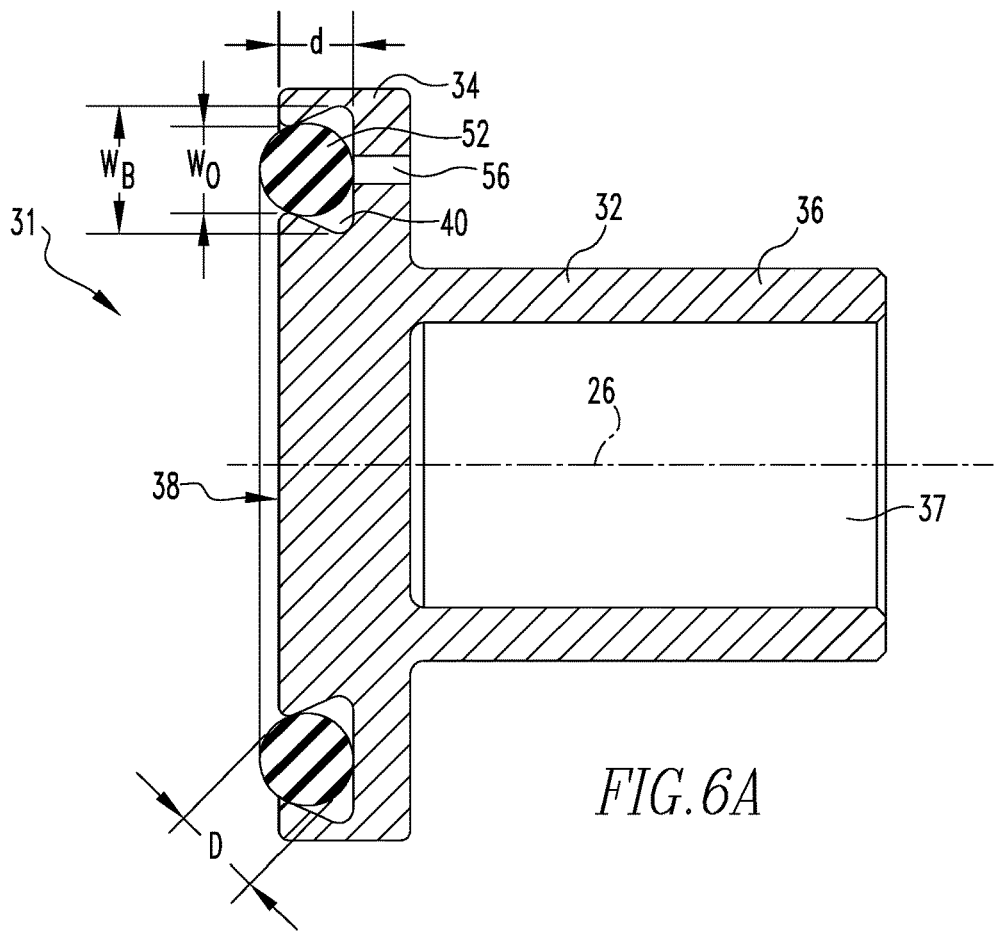
FIG. 6A is a sectional view of the piston assembly of the check valve of FIG. 1 taken along a line similar to the view of FIG. 2.
Figure 6B:
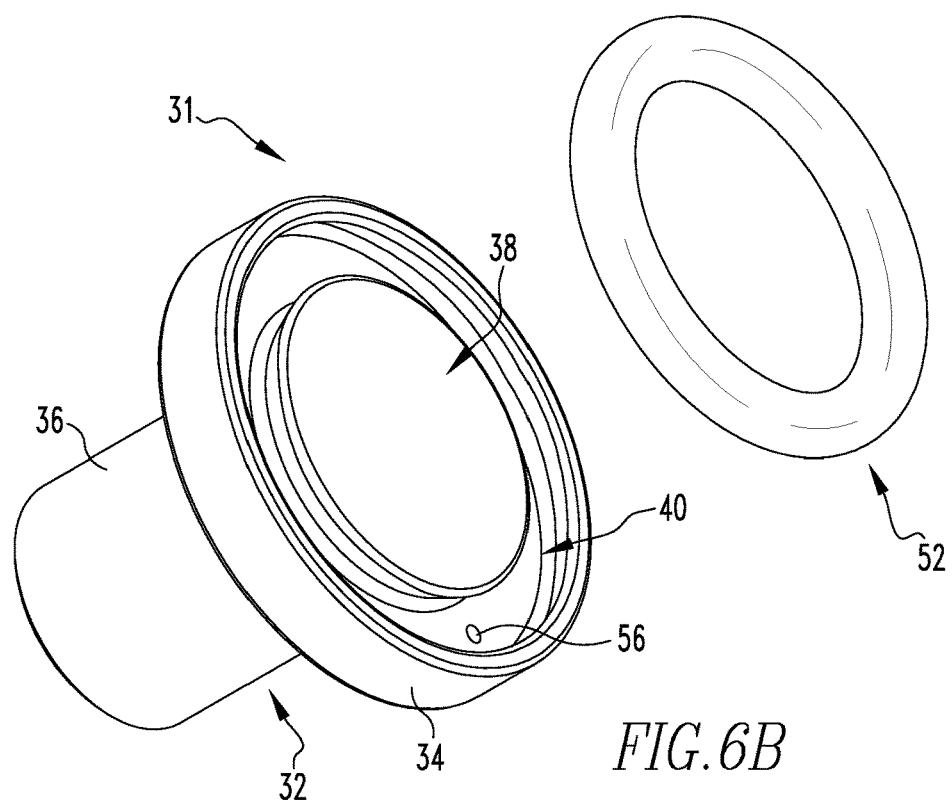
FIG. 6B is an exploded perspective view of the piston assembly of FIG. 6A.

Referring now to the detailed section and exploded views of the example piston assembly 31 shown in FIGS. 6A and 6B, groove 40 has an opening width Wo in sealing face 38 and a base width WB spaced the depth d of groove 40 from sealing face 38 (and thus opening width Wo). In the example embodiment show in FIGS. 6A and 6B, base width WB is greater than opening width Wo, hence it can be stated that groove 40 flares outward moving from sealing surface 38 into groove 40. When used in conjunction with O-ring 42 having a circular cross-section defined by an outer diameter D that is greater than opening width Wo, groove 40 serves to retain O-ring 42 therein. It is also noted that in such example embodiment that outer diameter D of O-ring 42 is less than base width WB of groove 40. It is to be appreciated that in the example embodiment shown in FIGS. 6A and 6B piston member 32 is a unitary body. While an example groove 40 is described in detail herein, it is to be appreciated that grooves of other cross-sections may be employed without varying from the scope of the disclosed concepts.

Figure 7A:
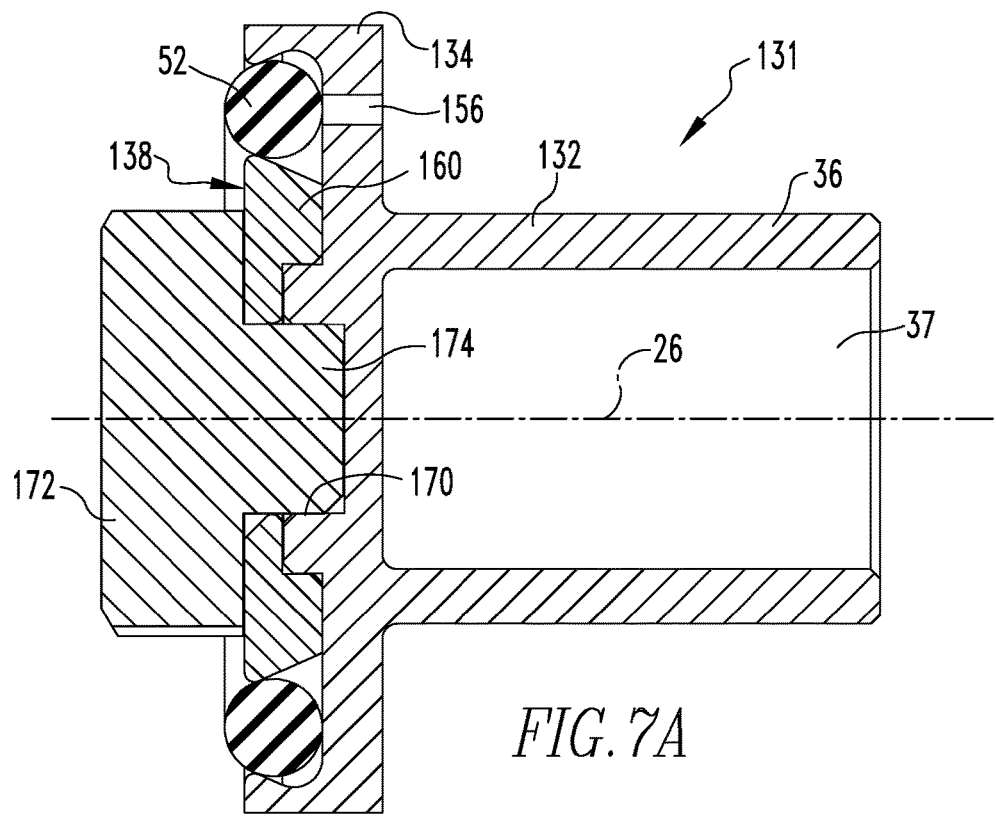
FIG. 7A is a sectional view, similar to FIG. 6A, of a piston assembly in accordance with another example embodiment of the disclosed concepts which may be employed in the check valve of FIG. 1 in place of the piston assembly shown in FIG. 1.
Figure 7B:
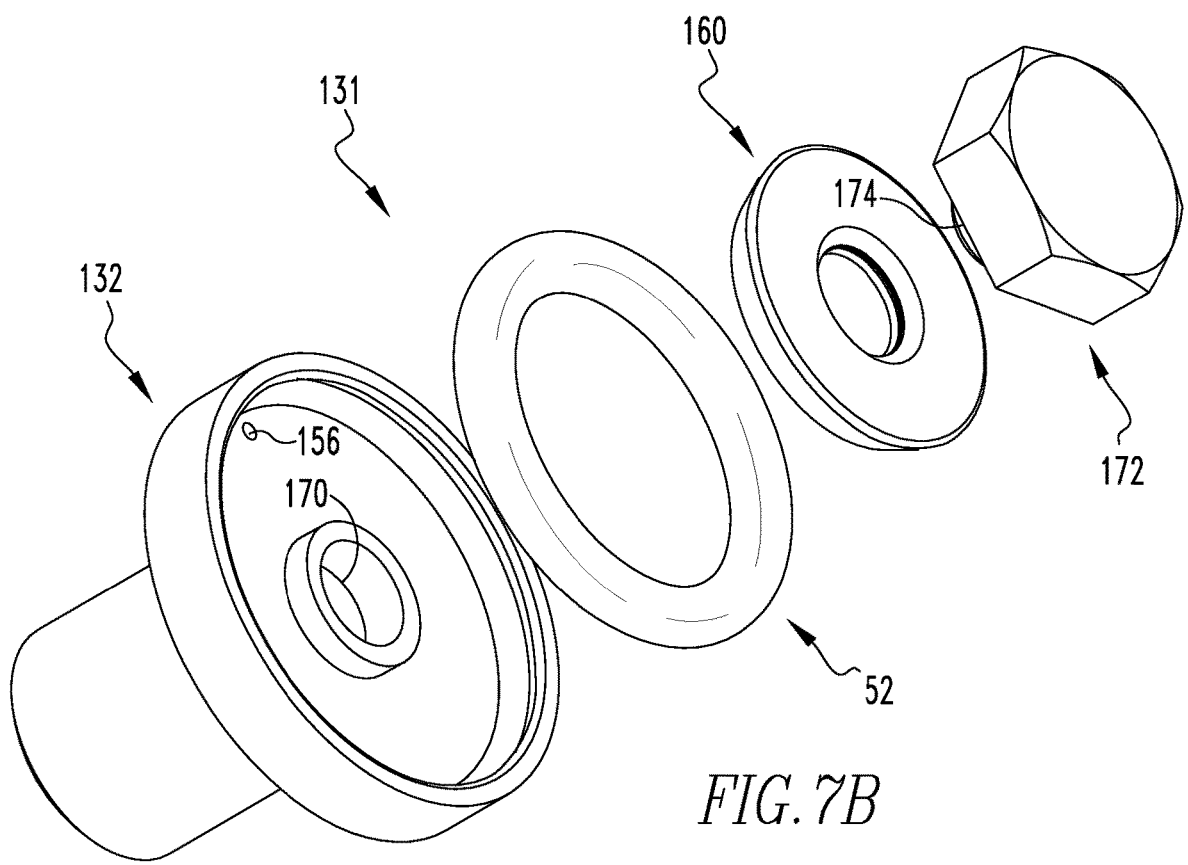
FIG. 7B is an exploded perspective view of the piston assembly of FIG. 7A.

An alternative piston assembly 131 which may be employed in sealing arrangement 30 of check valve 10 is shown in FIGS. 7A and 7B. Piston assembly 131 includes a piston member 132 having a tail portion 36 like that of piston member 32 and a head portion 134. Head portion 134 includes a groove 140, similar to groove 40 (previously described) defined therein extending inward from a sealing surface 138 of head portion 134. Unlike groove 40 which was defined completely by head portion 32, groove 140 is defined only in-part by head portion 132 and is also defined in-part by a retention ring 160 (which also defines a portion of sealing surface 138). More particularly, a radially inward wall, or a portion thereof, of groove 140 is defined by a radially outward wall of retention ring 160. In such embodiment, piston member 132 further includes an aperture 170 defined therein that extends axially along longitudinal axis 26. Retention ring 160 is coupled to piston member 132 by a fastener 172 having a coupling portion 174 mechanically engaged with aperture 170. Such coupling mechanical engagement between coupling portion 174 and aperture 170 may be accomplished via any suitable arrangement (e.g., without limitation, corresponding threads, force fit, etc.) without varying from the scope of the disclosed concepts.

Figure 8A:
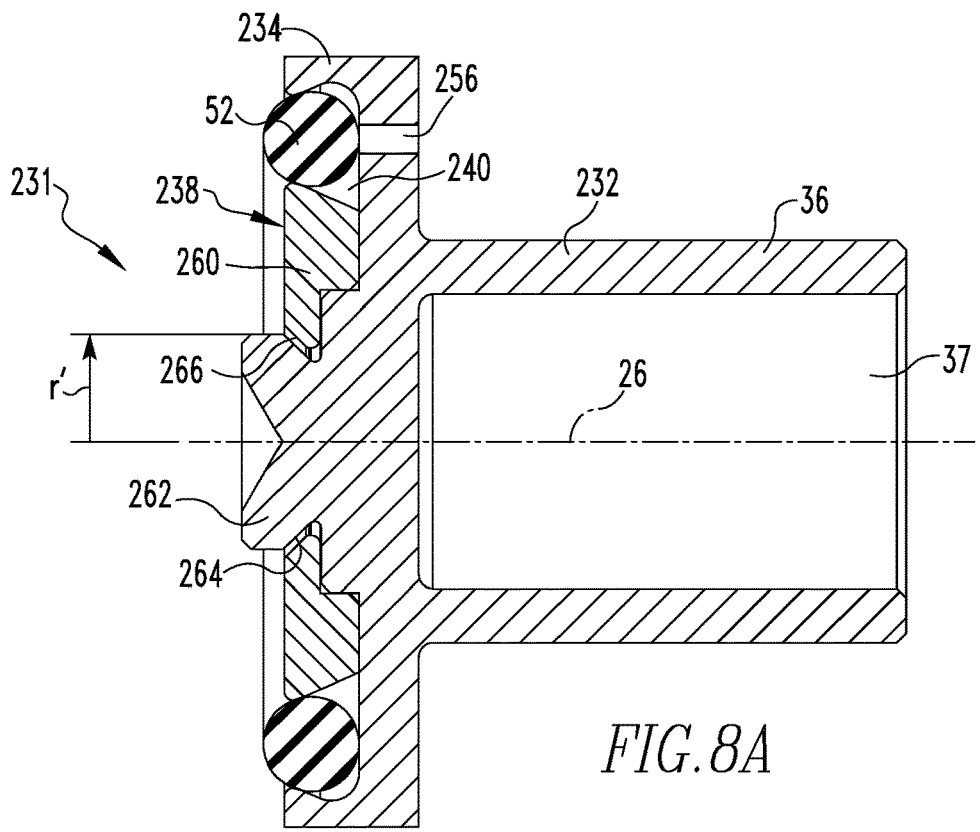
FIG. 8A is a sectional view, similar to FIGS. 6A and 7A, of a piston assembly in accordance with yet another example embodiment of the disclosed concepts which may be employed in the check valve of FIG. 1 in place of the piston assembly shown in FIG. 1.
Figure 8B:
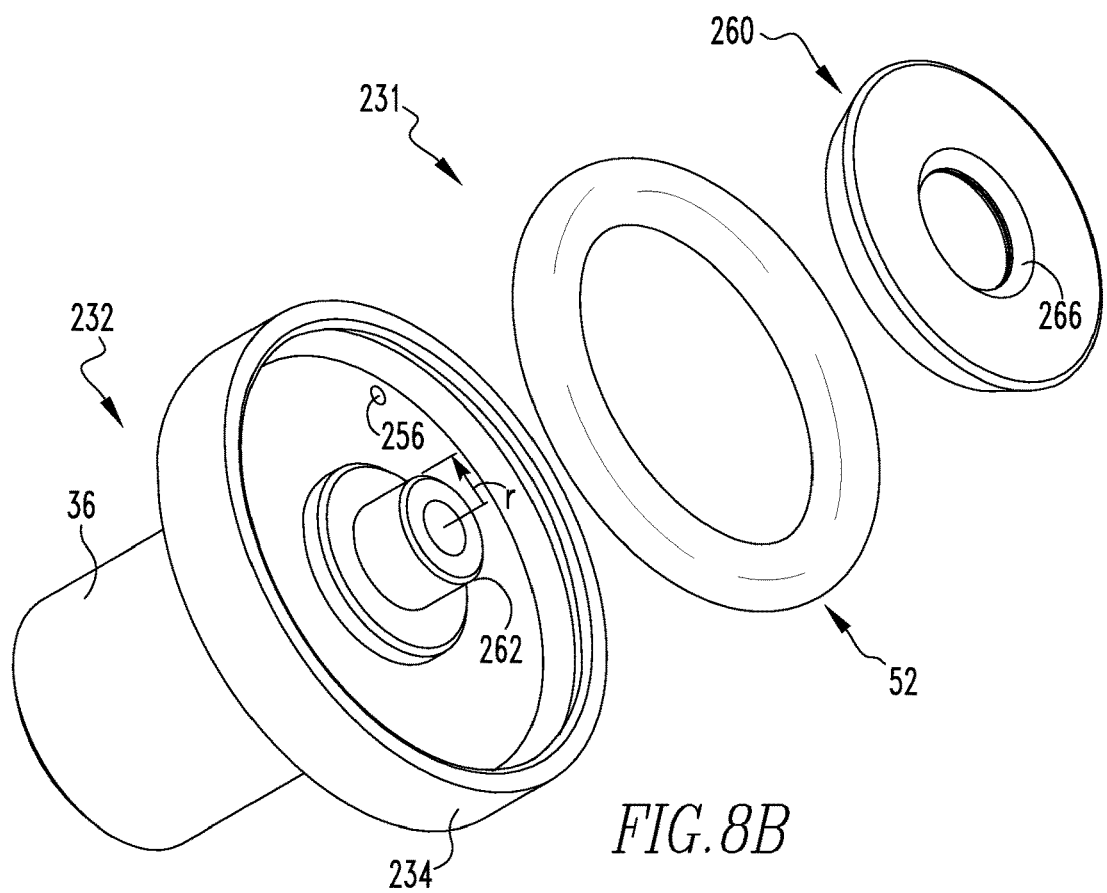
FIG. 8B is an exploded perspective view of the piston assembly of FIG. 8A.

Another alternative piston assembly 231 which may be employed in sealing arrangement 30 of check valve 10 is shown in FIGS. 8A and 8B. Piston assembly 231 includes a piston member 232 having a tail portion 36 like that of piston member 32 and a head portion 234. Head portion 234 includes a groove 240, similar to groove 140 (previously described) defined therein extending inward from a sealing surface 238 of head portion 234 which is defined in-part by head portion 232 and is also defined in-part by a retention ring 260 (which also defines a portion of sealing surface 238). More particularly, a radially inward wall, or a portion thereof, of groove 240 is defined by a radially outward wall of retention ring 260. In such embodiment, piston member 232 further includes a neck portion 262 extending outward from head portion 234 along longitudinal axis 26. Neck portion 262 is permanently deformable by tooling (e.g., machining and pressure, or other suitable arrangement) from a generally cylindrical shape, such as shown in FIG. 8B, to a permanently deformed position in which the radius of neck portion 262 has been increased from a first radius r (FIG. 8B) to a second radius r' (FIG. 8A) and the longitudinal length thereof (not labeled) has been shortened. In such deformed position, a portion 264 of neck portion 262 longitudinally overlies a radially inward portion 266 of retention ring 260, thus forming a retention groove (not numbered) in neck portion 262 that extends radially inward toward longitudinal axis 26. With radially inward portion 266 of retention ring 260 disposed/locked in the retention groove, retention ring 260, as well as O-ring 52 which was previously installed on head portion 232 prior to retention ring 260, are permanently coupled to head portion 234.

While some examples of how a retention ring 160, 260 in accordance with the disclosed concepts may be coupled in place have been provided, it is to be appreciated that other coupling arrangements may be employed without varying from the scope of the disclosed concepts.

In general, it is to be appreciated that the concepts disclosed herein make full use of properties of O-rings. By properly choosing the suitable material from the wide range of materials that the O-ring can be made from, the O-ring can be used in a huge range of applications such as high and low temperatures, high and low pressure, and different refrigerants etc. In addition, comparing to the traditional gasket design, an O-ring is a standard design, easily made, much cheaper and readily available. It is also to be appreciated that arrangements using a retention ring such as described herein allow for a broader range of materials to be employed in an O-ring and/or reduces the chance for damage to occur to an O-ring during installation as in such arrangements the O-ring is not distorted.

While specific embodiments of the disclosed concepts have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of concepts which are to be given the full breadth of the claims appended and any and all equivalents thereof.

What is claimed is:

1. A sealing arrangement for a check valve, the sealing arrangement comprising:
   a piston member disposed about a longitudinal axis, the piston member having a sealing face disposed perpendicular to the longitudinal axis;
   a groove defined in the piston member extending inward from the sealing face, the groove spaced a radial distance from the longitudinal axis; and
   an O-ring disposed in the groove,
   wherein the piston member further comprises a vent passage extending between the groove and a surface of the piston opposite the sealing face, and
   wherein the vent passage is structured to provide for the evacuation of any fluid trapped between the O-ring and the groove.

2. The sealing arrangement of claim 1, wherein the groove flares from an opening width in the sealing face to a base width spaced the depth of the groove from the opening width, and wherein the base width is greater than the opening width.

3. The sealing arrangement of claim 2, wherein the O-ring has a circular cross-section defined by an outer diameter, and wherein the outer diameter is greater than the opening width of the groove.

4. The sealing arrangement of claim 3, wherein the outer diameter is less than the base width of the groove.

5. The sealing arrangement of claim 1, wherein:
   the piston member comprises a head portion and a tail portion extending from the head portion to a distal end, and
   the sealing face is disposed on the head portion opposite the tail portion.

6. The sealing arrangement of claim 5, wherein:
   the tail portion defines a cylindrical recess therein extending from an opening defined in the distal end thereof toward the head portion, and
   wherein the cylindrical recess is structured to cooperatively slidingly engage a protruding portion of a housing of the check valve.

7. The sealing arrangement of claim 1, further comprising a retention ring disposed about the longitudinal axis and coupled thereto, and wherein a radially inward wall of the groove is defined by a radially outward wall of the retention ring.

8. The sealing arrangement of claim 7, wherein the piston member comprises a neck portion extending along the longitudinal axis, wherein the neck portion defines a retention groove therein extending radially inward toward the longitudinal axis, and wherein the retention ring is coupled to the piston member via a mechanical interaction between the retention ring and the retention groove.

9. The sealing arrangement of claim 7, wherein the piston member comprises an aperture defined therein extending axially along the longitudinal axis from an opening toward the tail portion, and wherein the retention ring is coupled to the piston by a fastener having a coupling portion mechanically engaged with the aperture.

10. A check valve comprising:
    a housing defining an inlet, an outlet, a passage between the inlet and the outlet, and a sealing surface along the passage;
    a sealing arrangement disposed within the passage, the sealing arrangement comprising:
      a piston member disposed about a longitudinal axis, the piston member having:
        a sealing face disposed perpendicular to the longitudinal axis; and
        a circular groove defined in the piston member extending inward from the sealing face, the circular groove disposed around and spaced a radial distance from the longitudinal axis;
      an O-ring disposed in the groove; and
      a biasing member in engagement with the housing and the piston member so as to exert a biasing force on the piston and thus force the O-ring into sealing engagement with the sealing surface of the housing such that the outlet is sealed from the inlet,
    wherein the piston member is moveable from:
      a first position in which the O-ring is sealingly engaged with the sealing surface of the housing and thus the outlet is sealed from the inlet, and
      a second position in which the O-ring is spaced from the sealing surface of the housing and thus the outlet is not sealed from the inlet.

11. The check valve of claim 10, wherein the piston member is structured to move from the first position to a second position when a force exerted on the sealing face is greater than the biasing force.

12. The check valve of claim 10, wherein the housing comprises:
    a main body defining the inlet; and
    a tailpiece defining the outlet, wherein the tailpiece is coupled to the main body.

13. The check valve of claim 10, wherein the biasing member comprises a coil spring.

14. The check valve of claim 10, wherein the groove flares from an opening width in the sealing face to a base width spaced the depth of the groove from the opening width, and wherein the base width is greater than the opening width.

15. The check valve of claim 14, wherein the O-ring has a circular cross-section defined by an outer diameter, and wherein the outer diameter is greater than the opening width of the groove.

16. The check valve of claim 10, wherein:
the piston member comprises a head portion and a tail portion extending from the tail portion to a distal end, and
the sealing face is disposed on the head portion opposite the tail portion.

17. The check valve of claim 16, wherein:
the tail portion defines a cylindrical recess therein extending from an opening defined in the distal end thereof toward the head portion, and
wherein the cylindrical recess is structured to cooperatively engage a protruding portion of a housing of the check valve.

18. The check valve of claim 10, further comprising a retention ring disposed about the longitudinal axis and coupled thereto, and wherein a radially inward wall of the groove is defined by a radially outward wall of the retention ring.

19. The check valve of claim 18, wherein the piston member comprises a neck portion extending along the longitudinal axis, wherein the neck portion defines a retention groove therein extending radially inward toward the longitudinal axis, and wherein the retention ring is coupled to the piston member via a mechanical interaction between the retention ring and the retention groove.

20. The check valve of claim 18, wherein the piston member comprises an aperture defined therein extending axially along the longitudinal axis from an opening toward the tail portion, and wherein the retention ring is coupled to the piston by a fastener having a coupling portion mechanically engaged with the aperture.

21. The check valve of claim 10, wherein the piston member further comprises a vent passage extending between the groove and a surface of the piston opposite the sealing face, and wherein the vent passage is structured to provide for the evacuation of any fluid trapped between the O-ring and the groove.

* * * * *